(12) United States Patent
Fischer et al.

(10) Patent No.: US 7,650,023 B2
(45) Date of Patent: Jan. 19, 2010

(54) METHOD FOR FILTERING TOMOGRAPHIC 3D IMAGES AFTER COMPLETED RECONSTRUCTION OF VOLUME DATA

(75) Inventors: Daniel Fischer, Erlangen (DE); Thomas Flohr, Uehlfeld (DE); Rainer Raupach, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 669 days.

(21) Appl. No.: 11/062,703

(22) Filed: Feb. 23, 2005

(65) Prior Publication Data

US 2005/0190984 A1 Sep. 1, 2005

(30) Foreign Application Priority Data

Feb. 24, 2004 (DE) .................. 10 2004 008 979

(51) Int. Cl.
*G06K 9/00* (2006.01)
*G06K 9/40* (2006.01)
*G06K 9/38* (2006.01)

(52) U.S. Cl. .................. 382/128; 382/131; 382/206; 382/261; 382/266; 382/267; 382/268; 382/269; 382/270; 382/272

(58) Field of Classification Search .................. None
See application file for complete search history.

(56) References Cited

U.S. PATENT DOCUMENTS

| | | | | |
|---|---|---|---|---|
| 3,866,229 A | * | 2/1975 | Hammack | 342/451 |
| 4,745,550 A | * | 5/1988 | Witkin et al. | 702/11 |
| 4,829,552 A | * | 5/1989 | Rossi et al. | 378/154 |
| 5,311,305 A | * | 5/1994 | Mahadevan et al. | 348/169 |
| 5,343,309 A | * | 8/1994 | Roetling | 358/3.07 |
| 5,351,305 A | | 9/1994 | Wood et al. | |
| 5,909,476 A | * | 6/1999 | Cheng et al. | 378/4 |
| 6,064,073 A | * | 5/2000 | Hoogenraad | 250/573 |

(Continued)

FOREIGN PATENT DOCUMENTS

EP 0 507 485 A2 10/1992

(Continued)

OTHER PUBLICATIONS

Shuqian Luo et al., "Filtering Medical Image Using Adaptive Filter", IEEE, Engineering in Medicine and biology Society, 2001, vol. 3, pp. 2727-2729.

(Continued)

*Primary Examiner*—Vikkram Bali
*Assistant Examiner*—Michelle Entezari
(74) *Attorney, Agent, or Firm*—Harness, Dickey & Pierce, P.L.C.

(57) ABSTRACT

A method is for filtering tomographic 3D images of an examination object. The examination object is imaged by using a volume model that divides the volume of the examination object into a multiplicity of three-dimensional image voxels with individual image values, wherein the image value of each voxel reproduces an object-specific property of the examination object in this volume. After the reconstruction of the total volume for each voxel, variances are calculated in a prescribed region or radius R in order to determine contrast jumps and their spatial orientation with their tangential planes T. The image values in the tangential plane T are filtered with a two-dimensional convolution, and subsequently the original voxel data are mixed in weighted fashion with the filtered voxel data.

24 Claims, 4 Drawing Sheets

U.S. PATENT DOCUMENTS

| | | | |
|---|---|---|---|
| 6,201,988 B1* | 3/2001 | Bourland et al. | 600/427 |
| 6,373,977 B1* | 4/2002 | Culbertson | 382/154 |
| 6,466,700 B1 | 10/2002 | Makram-Ebeid | |
| 6,473,697 B2 | 10/2002 | Bouts et al. | |
| 6,496,608 B1* | 12/2002 | Chui | 382/300 |
| 6,539,074 B1* | 3/2003 | Yavuz et al. | 378/4 |
| 6,668,083 B1* | 12/2003 | Verdonck et al. | 382/203 |
| 6,674,430 B1* | 1/2004 | Kaufman et al. | 345/419 |
| 6,738,499 B1* | 5/2004 | Doi et al. | 382/128 |
| 6,909,794 B2* | 6/2005 | Caspi | 382/128 |
| 6,999,630 B1* | 2/2006 | Drouot | 382/262 |
| 7,043,063 B1* | 5/2006 | Noble et al. | 382/128 |
| 7,068,826 B2* | 6/2006 | Jabri et al. | 382/128 |
| 7,194,117 B2* | 3/2007 | Kaufman et al. | 382/128 |
| 2001/0046312 A1* | 11/2001 | Murakami | 382/128 |
| 2002/0012417 A1* | 1/2002 | Bruder et al. | 378/4 |
| 2002/0054038 A1* | 5/2002 | Nemoto | 345/419 |
| 2002/0062075 A1* | 5/2002 | Takeo | 600/407 |
| 2002/0071600 A1* | 6/2002 | Yamada | 382/132 |
| 2002/0094112 A1* | 7/2002 | Makram-Ebeid | 382/128 |
| 2002/0186809 A1* | 12/2002 | Flohr et al. | 378/4 |
| 2003/0071220 A1* | 4/2003 | Bruder et al. | 250/369 |
| 2004/0075659 A1* | 4/2004 | Taubin | 345/428 |
| 2004/0081340 A1* | 4/2004 | Hashimoto | 382/128 |
| 2004/0197015 A1* | 10/2004 | Fan et al. | 382/128 |
| 2004/0258285 A1* | 12/2004 | Hansen et al. | 382/128 |
| 2005/0169526 A1* | 8/2005 | Romsdahl et al. | 382/173 |
| 2005/0195937 A1* | 9/2005 | Bruder et al. | 378/19 |
| 2005/0207630 A1* | 9/2005 | Chan et al. | 382/131 |
| 2006/0002585 A1* | 1/2006 | Larson et al. | 382/103 |
| 2006/0013455 A1* | 1/2006 | Watson et al. | 382/128 |
| 2006/0078182 A1* | 4/2006 | Zwirn et al. | 382/128 |
| 2006/0098856 A1* | 5/2006 | Botterweck et al. | 382/131 |
| 2007/0036418 A1* | 2/2007 | Pan et al. | 382/131 |
| 2007/0047790 A1* | 3/2007 | Dewaele | 382/128 |
| 2007/0073114 A1* | 3/2007 | Gundel | 600/300 |
| 2007/0086647 A1* | 4/2007 | Grady | 382/154 |
| 2007/0147674 A1* | 6/2007 | Gundel | 382/131 |
| 2008/0123912 A1* | 5/2008 | Lal et al. | 382/128 |

FOREIGN PATENT DOCUMENTS

| | | | |
|---|---|---|---|
| WO | WO 01/63323 A1 | 8/2001 | |

OTHER PUBLICATIONS

Rafael C. Gonzalez, "Digital Image Processing", Addison-Wesley, 1992, pp. 195-198.

Tony F. Chan et al., "The digital TV filter and nonlinear denoising", http://citeseer.nj.nec.com/article/chan01digital.html, 1999, Tech. Report CAM 99-34, Department of Mathematics, UCLA Los Angeles, CA, 1999; IEEE Trans. Image Process., to appear [Abrufdatum May 15, 2003].

Winkler G., Hahn et al., "Recent Developments in Edge-Preserving Smoothing", Institute of Biomathemiatics and Biometry, GSF-National Research Center for Environment and Health 1998, pp. 1-10.

Chinese Office Action for Chinese Application No. 200510050929.6. (English Translation).

An AdaptiveImage Enhancement Algorithm Based on Human Visual Properties, Yuan Xiaosong, Wang Xiutan, Wang Xiqin, Dept. of Electronic Engineering, Tsinghua, University, Beijing 100084.

* cited by examiner

METHOD FOR FILTERING TOMOGRAPHIC 3D IMAGES AFTER COMPLETED RECONSTRUCTION OF VOLUME DATA

The present application hereby claims priority under 35 U.S.C. §119 on German patent application numbers DE 10 2004 008 979.5 filed Feb. 24, 2004, the entire contents of which is hereby incorporated herein by reference.

FIELD OF THE INVENTION

The invention relates to a method for filtering tomographic 3D images of an examination object, preferably CT or NMR or PET pictures of a patient. The examination object may be imaged by using a volume model that divides the volume of the examination object into a multiplicity of three-dimensional image voxels with individual image values, with the image value of each voxel reproducing an object-specific property of the examination object in this volume.

BACKGROUND OF THE INVENTION

Methods for suppressing noise in volume data are known in principle. Thus, noise can be effectively reduced with the aid of linear low pass filtering. However, in this case, there is a reduction in the sharpness of the data material and thus in the quality of the imaging of small structures. This simple approach can therefore be used only in a limited way to improve the image material.

Another method is based on two- or three-dimensional, iterative filtering of the data material, information relating to the position and orientation of edges being input in each step. Reference may be made by way of example in this context to T. Chan, S. Osher, and J. Shen; *The digital TV filter and non-linear denoising*; http://citeseer.nj.nec.com/article/chan01digital.html, 1999, Tech. Report CAM 99-34, Department of Mathematics, UCLA, Los Angeles, Calif., 1999; IEEE Trans. Image Process., to appear [Call date May 15, 2003] or Winkler G., Hahn K., Aurich V.; *Recent Developments in Edge-Preserving Smoothing*; Institute of Biomathematics and Biometry, GSF-National Research Center for Environment and Health, Neuherberg, 1998.

Because of the "central limit" theorem, these above-named methods lead to a Gauss-type filter characteristic that for radiologists frequently does not correspond to the customary image impression of diagnostic images and is therefore rejected. A further problem resides in the run time of such algorithms which, because of many iterations, is in the range of minutes per axial section, and therefore renders the method clinically inappropriate.

Nevertheless, there is still a requirement to find a possibility of dose optimization so that the radiation load on patients owing to diagnostic methods can be kept as low as possible or reduced.

SUMMARY OF THE INVENTION

It is an object of an embodiment of the invention to find a method for filtering tomographic 3D images of an examination object which renders possible a better ratio of applied dose to image quality, and/or a richness of detail in the representation of the image.

The inventors have realized that it is advantageous for filtering also to make use of items of information of the image data that are in a direction perpendicular to the axial sections. Small structures that cross the sections and are reduced in contrast owing to the partial volume effect are otherwise not correctly detected in part, and as a result of this they are impaired by the filter or even removed.

Consequently, the inventors propose to improve the method known per se for filtering tomographic 3D images of an examination object, preferably CT or NMR or PET pictures of a patient, in which the examination object is imaged by using a volume model that divides the volume of the examination object into a multiplicity of three-dimensional image voxels with individual image values, and the image value of each voxel reproduces an object-specific property of the examination object in this volume, to the effect that after the reconstruction of the total volume for each voxel, which represents a data point with the aid of three-dimensional coordinates x, y, z in the Cartesian coordinate system of the examination object, variances are calculated in a prescribed region or radius R in order to determine contrast jumps and their spatial orientation with their tangential planes T, the image values in the tangential plane T are filtered with a two-dimensional convolution, and subsequently the original voxel data are mixed in weighted fashion with the filtered voxel data.

As a result of this method of an embodiment, either an improved image quality is yielded in conjunction with an equal dose commitment of the patient, or it is possible to work with a lesser dose commitment in order to achieve the same image quality.

In a first advantageous design of an embodiment, one-dimensional variances can be calculated for at least three spatial directions of which three spatial directions are linearly independent. It is advantageous here when the multiplicity of spatial directions for which one-dimensional variances are calculated are distributed as uniformly as possible in space. A distribution that is as uniform as possible can be achieved, for example, when canonical axes and/or surface diagonals and/or space diagonals of an arbitrary cuboid reference volume in the examination area are used as spatial directions. If all specified axes are used, this yields overall a number of 13, with 3 canonical axes, 6 surface diagonals and 4 space diagonals. It is further to be noted in this case that the cuboid reference volume can be arranged arbitrarily in space, it being preferred to use a cube, since no preferred directions thereby exist.

The spatial orientation of a contrast jump can be determined by the tangential plane T, this plane being defined by the vectors $v_{min}$ and $v_\perp$, the vector $v_\perp$ in turn being perpendicular to the plane defined by the vectors $v_{min}$ and $v_{max}$ and the vector $v_{max}$ pointing in the direction of the largest magnitude of the variance, and the vector $v_{min}$ pointing in the direction of the smallest magnitude of the variance.

It also may be advantageous to carry out the filtering in the tangential plane T by use of two-dimensional convolution in such a way that the filter $F(v_{min}, v_\perp)$ used is formed as a function of the minimum variance $v_{min}$ and the maximum variance $v_\perp$ in the tangential plane T.

It is further advantageous concerning the selection of the concrete filter when the filter $F(v_{min}, v_\perp)$ is designed in such a way that when the variances $v_{min}$ and $v_\perp$ are of different size a smaller filter strength is produced in the direction of larger variance and a larger filter strength is produced in the direction of smaller variance. The filter $F(v_{min}, v_\perp)$ is preferably of isotropic design in the case of variances of equal size.

In addition to the method with the calculation of one-dimensional variances, a method is also possible which calculates two-dimensional variances on at least three planes of which two are linearly independent of one another.

In a way similar to that outlined above, the aim here should be for the multiplicity of planes in which the two-dimensional variance is calculated to be aligned distributed as uniformly as possible in space with reference to their normal vector, since in this way all spatial directions are taken into account uniformly.

Furthermore, it is possible to make preferential use of planes over which the two-dimensional variances are determined and whose normal corresponds to the canonical axes and/or surface diagonals and/or space diagonals of an arbitrary cuboid reference volume in the examination area.

That plane which has the smallest two-dimensional variance will preferably be selected as tangential plane.

In the case of this two-dimensional method, as well, one-dimensional variances of different directions can ultimately be determined in the tangential plane T and the direction of the minimum variance $v_{min}$ and the perpendicular $v_\perp$ thereto can be determined therefrom, the perpendicular $v_\perp$ being taken by definition as the direction of the maximum one-dimensional variance $v_{T,max}$ in the tangential plane.

Conversely, one-dimensional variances of different directions can also be determined in the tangential plane and the direction of the maximum variance in the plane $v_{max}$ and the perpendicular $v_\perp$ thereto can be determined therefrom, the perpendicular $v_\perp$ being taken by definition as the direction of the minimum one-dimensional variance $v_{T,min}$ in the tangential plane.

Particularly advantageous filtering may be yielded when the filtering is carried out in the tangential plane T by use of two-dimensional convolution in such a way that the filter $F(v_{min}, v_{T,max})$ or $F(v_{max}, v_{T,min})$ is formed as a function of the maximum variance $v_{max}$ and the minimum variance $v_{T,min}$ or of the minimum variance $v_{min}$ and the maximum variance $v_{T,max}$ in the tangential plane T. Here, the filter $F(v_{min}, v_{T,max})$ or $F(v_{max}, v_{T,min})$ can be designed in such a way that when the variances are of different size a smaller filter strength is used in the direction of larger variance and a larger filter strength is used in the direction of smaller variance, or in the case of the one-dimensional variances determined in the plane being of equal size, the filter $F(v_{min}, v_{T,max})$ or $F(v_{max}, v_{T,min})$ can be of isotropic design.

According to an embodiment of the invention, it may be further advantageous when a typical variance $v_{typ}$ is determined in the surroundings and the original voxel data are mixed in weighted fashion with the filtered voxel data in such a way that in the case of $v_{max} \gg v_{typ}$ a greater weight is ascribed to the original voxel data than to the filtered voxel data, and in the case of $v_{max} \ll v_{typ}$ a lesser weight is ascribed to the original voxel data than to the filtered voxel data. The mean value of the previously determined one-dimensional variances, for example, can be taken as typical variance $v_{typ}$ in the surroundings, or the mean value of the previously determined two-dimensional variances can be taken. It is also possible to calculate a three-dimensional variance in a prescribed region or a radius R.

According to an aspect of an embodiment of the invention, the inventors also propose a medical tomography system for examining a patient and for taking tomographic pictures of a patient, in particular a CT system, a PET system or an NMR system, having a recording system and at least one arithmetic logic unit with programs or program modules for reconstructing tomographic images, which has at least one arithmetic logic unit with programs or program modules that execute during operation the method steps of at least one preceding method. In the sense of an embodiment of the invention, CT systems are understood not only as conventional CT systems but also as so-called C arc systems.

BRIEF DESCRIPTION OF THE DRAWINGS

The method according to the invention for three-dimensional filtering is described in more detail below by use of exemplary embodiments, taking account of local one-dimensional variances, with the aid of the figures, in which, in detail.

DETAILED DESCRIPTION OF THE EXEMPLARY EMBODIMENTS

Figure 1:
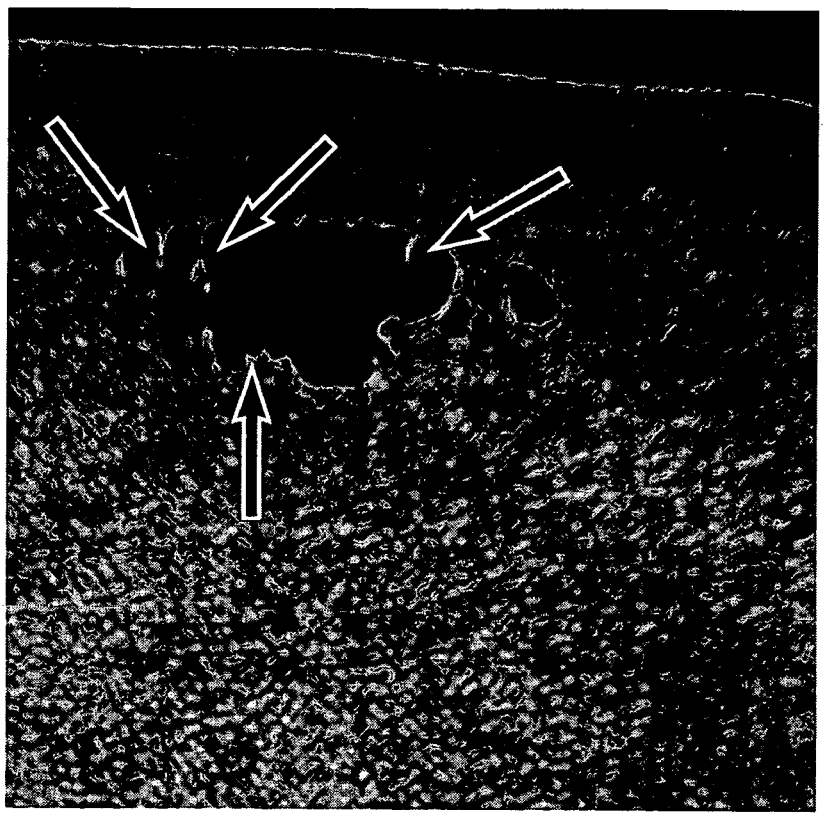
FIG. 1: shows a colon CT picture without filtering.
Figure 2:
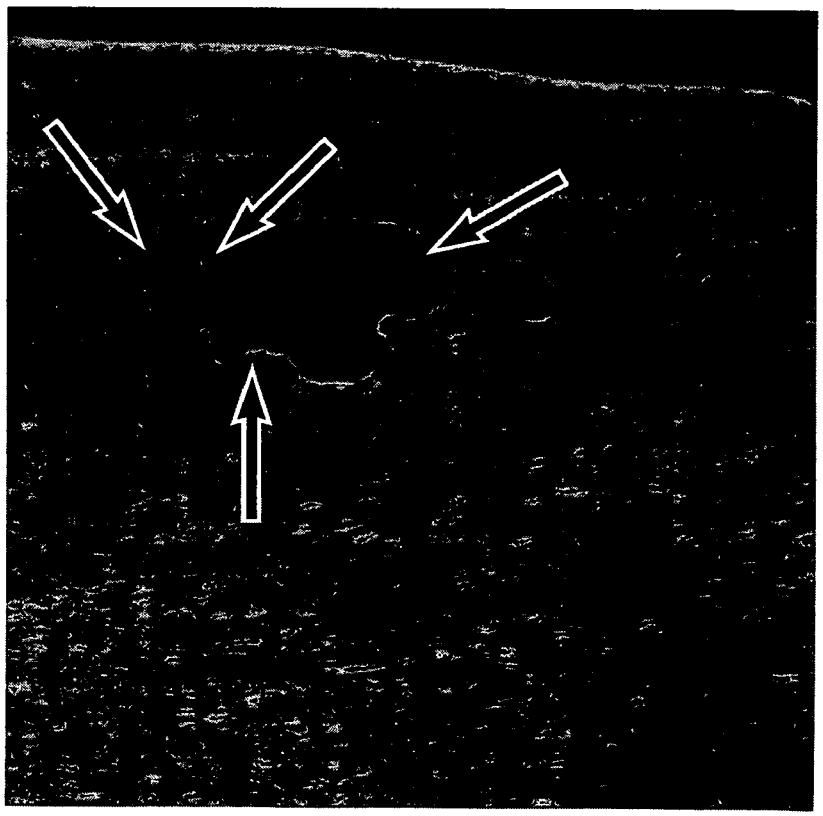
FIG. 2: shows a colon CT picture with linear filtering.

FIGS. 1 and 2 show the problems of linear low pass filtering of a CT picture. Shown in FIG. 1 is the unfiltered image of a CT section that is reproduced in FIG. 2 after filtering by a linear low pass filter. Although the desired reduction in noise is yielded thereby, the image sharpness decreases, small structures are lost and the edges become blurred. These problem areas are indicated in FIGS. 1 and 2 by the arrows drawn in.

Figure 3:
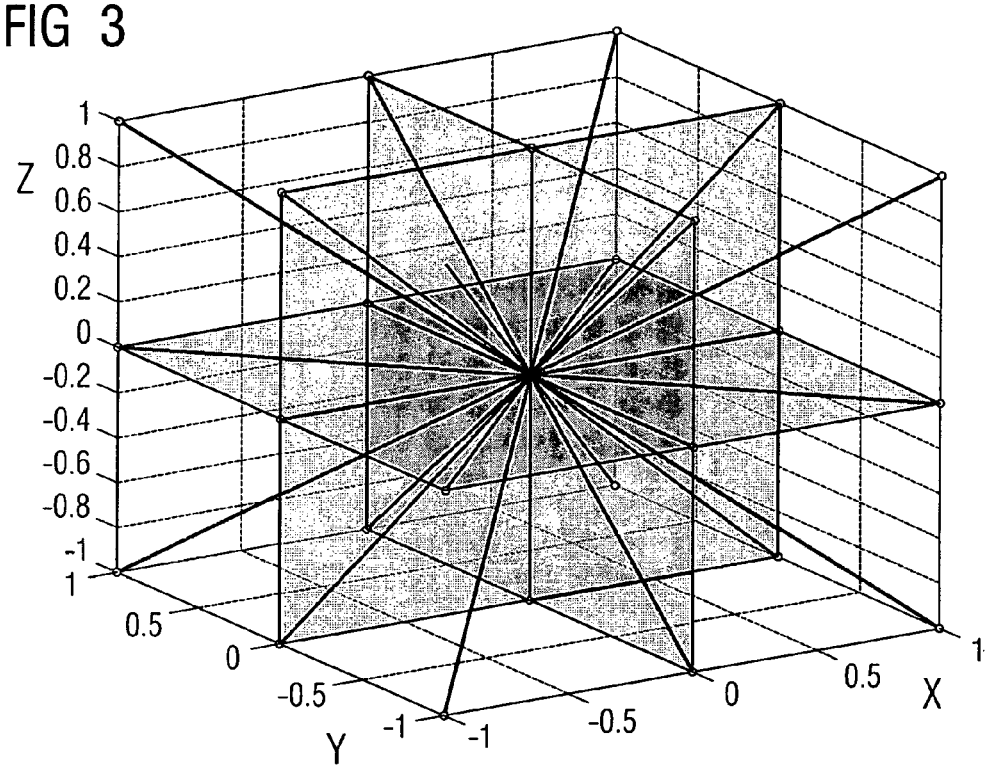
FIG. 3: shows an illustration of selected directions for variance calculation.

In accordance with the method according to an embodiment of the invention, this problem is solved, for example, by applying the following, particularly preferred method steps:

Step 1:

For each image voxel which represents a data point in the three-dimensional space of an examination object having coordinates x, y, z, one-dimensional variances are calculated in a suitable radius R for numerous spatial directions. An expedient selection for these spatial directions is illustrated by way of example in FIG. 3. Illustrated here are the three canonical axes, the six surface diagonals and the four space diagonals, that is to say a total of 13 preferred directions inside a cube of edge length 1. These 13 preferred spatial directions illustrated yield a largely isotropic distribution of the directions in the three-dimensional space without a particular preferred orientation.

A similarly uniform distribution could also be achieved by positioning a polyhedron with identical faces about the point under consideration such that the latter forms the geometrical centroid of the polyhedron, the connecting lines from the geometrical centroid to the corner points being able to function as preferred uniformally distributed spatial directions.

The region under consideration with the radius R, in which the calculation of the linear variances is performed, is preferably selected to be of the order of magnitude of the correlation length of the filter, which is described in step 4.

Step 2: If an oriented contrast jump or an edge is present locally, then the nature of the distribution of the one-dimensional variances from step 1 is such that the magnitude is greatest for that direction $v_{max}$ which is perpendicular to the edge in three-dimensional space. The plane perpendicular to the selected direction is therefore the tangential plane T to the edge.

Figure 4:
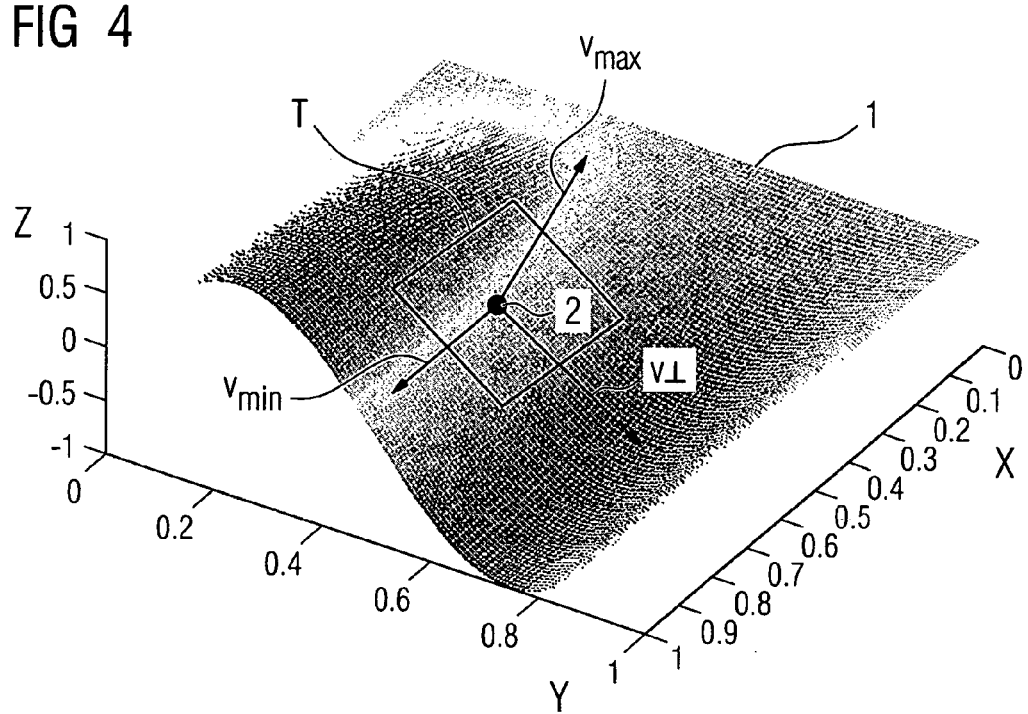
FIG. 4: shows a diagram of a contrast jump in a tomographic image.

FIG. 4 shows such a tangential plane T in an image of a detail of an object. The two-dimensional contour of this three-dimensional object having the same CT values is illustrated here as interface 1 on which an image voxel 2 and its surroundings are under consideration. Starting from this image voxel 2, the direction of the largest measured linear variance $v_{max}$ and the direction of the smallest measured linear variance $v_{min}$ are shown, the tangential plane T being defined by the perpendiculars to $v_{min}$ and $v_{max}$ and by the vector $v_{min}$.

Step 3: The direction adopted by the largest variance is now decided in turn in the tangential plane determined in step 2. This can also be performed approximately with the values already calculated in step 1, it being possible to assume that the direction of largest variance is to be set equal to the direction $v_\perp$ from the cross product of $v_{max} \times v_{min}$.

Step 4: Filtering is now performed in the tangential plane T with the aid of a two-dimensional convolution, the kernel taking account of the direction and the ratio of the magnitudes of $v_\perp$ and $v_{min}$. In principle, the filter characteristic can be modeled as desired, the strength of the filter being greater in qualitative terms in the direction of $v_{min}$ than along $v_\perp$. Account is thereby taken of the local property that no rapidly changing structures are located along $v_{min}$. The two-dimensional filter is isotropic or one-dimensional for the two limiting cases $v_{min} = v_\perp$, which arise, for example, at the outer edges of convex objects, for example $v_{min} \ll v_\perp$, such as occur, for example at the inner wall of a cylinder.

Figure 5:
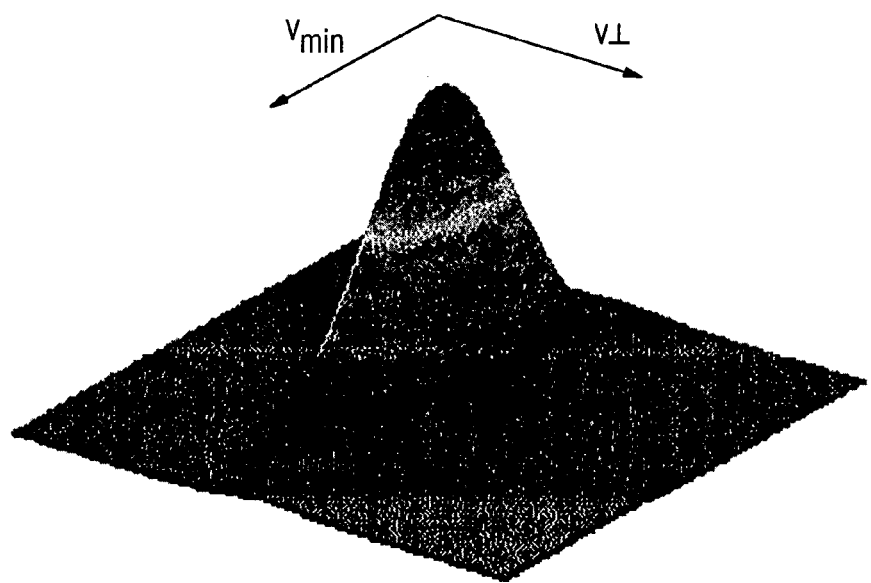
FIG. 5: shows a diagram of a filter according to an embodiment of the invention in relation to the area around the voxel considered in FIG. 4.

An exemplary filter is illustrated in FIG. 5. This filter corresponds to an oriented Gaussian distribution, and in accordance with the statements made above, the filtering is more strongly pronounced in the direction of the smallest variance $v_\perp$ than in the direction of the largest variance. The illustrated basic area of the filter corresponds here approximately to the basic area of the tangential plane T depicted in FIG. 4, but this is not a necessary condition. The spatial orientation of the illustrated filter is described by the depicted vectors $v_{min}$ and $v_\perp$.

Step 5: Finally, the original voxel data and the voxel data filtered in accordance with step 4 are mixed with local weights. It holds qualitatively in this case that: if $v_{max}$ is substantially greater than the typical variance of the surroundings, the original is given a high weight, and if $v_{max}$ is less than or in the region of the typical ambient variance, the filtered image is given the greater weight. Account is thereby taken of a property of the human eye, which perceives noise in the vicinity of high contrasts to a lesser extent than in homogeneous surroundings.

Figure 6:
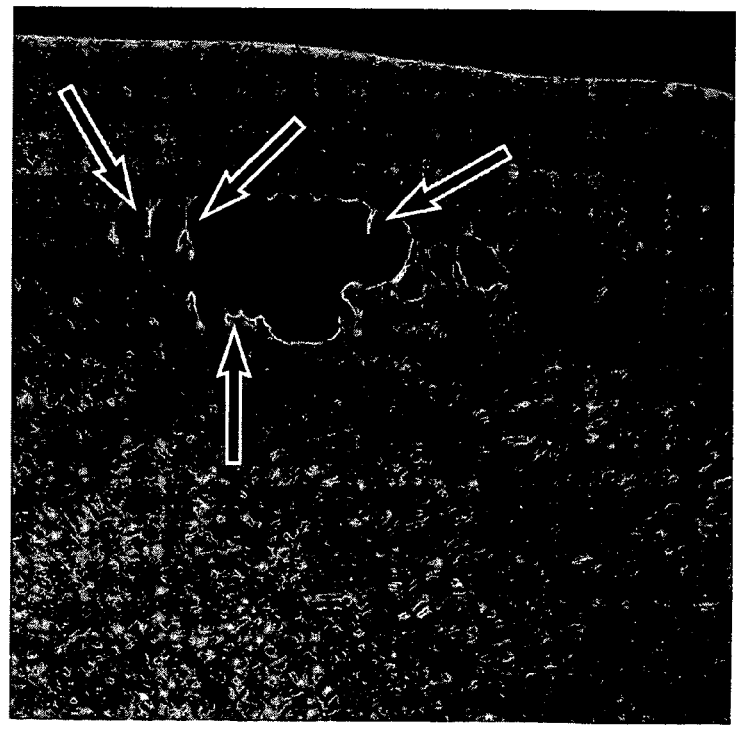
FIG. 6: shows a colon CT picture with filtering according to an embodiment of the invention.

Such filtering results in an image of substantially richer detail, as is shown in FIG. 6, for example. This image corresponds to the colon picture from FIG. 1, shown at the beginning, but the image processing according to the invention has been carried out here. It is clearly to be seen at the areas marked by arrows that this illustration is substantially richer in detail than FIG. 2, and the edges of the original are retained, and also that small structures can still be effectively seen.

It may also be pointed out in addition that, as an alternative to the method represented above with the initial calculation of one-dimensional variances for detecting contrast jumps in step 1, it is also possible to calculate two-dimensional variances on planes. For example, it is possible to select planes whose surface normals constitute the above-named 13 preferred directions. However, this method is associated with a higher computational outlay and performance is therefore poorer. The plane that has the lowest two-dimensional variance can then be used to select the tangential plane in step 2. Furthermore, in accordance with step 3 of the method, $v_{min}$ is then by definition the minimum variance of the one-dimensional variances lying in the tangential plane, and $v_\perp$ is the spatial direction orthogonal thereto and defining the tangential plane T.

It may further be remarked that the three space vectors $v_{min}$, $v_{max}$ and $v_\perp$ need not necessarily define a rectangular coordinate system.

Figure 7:
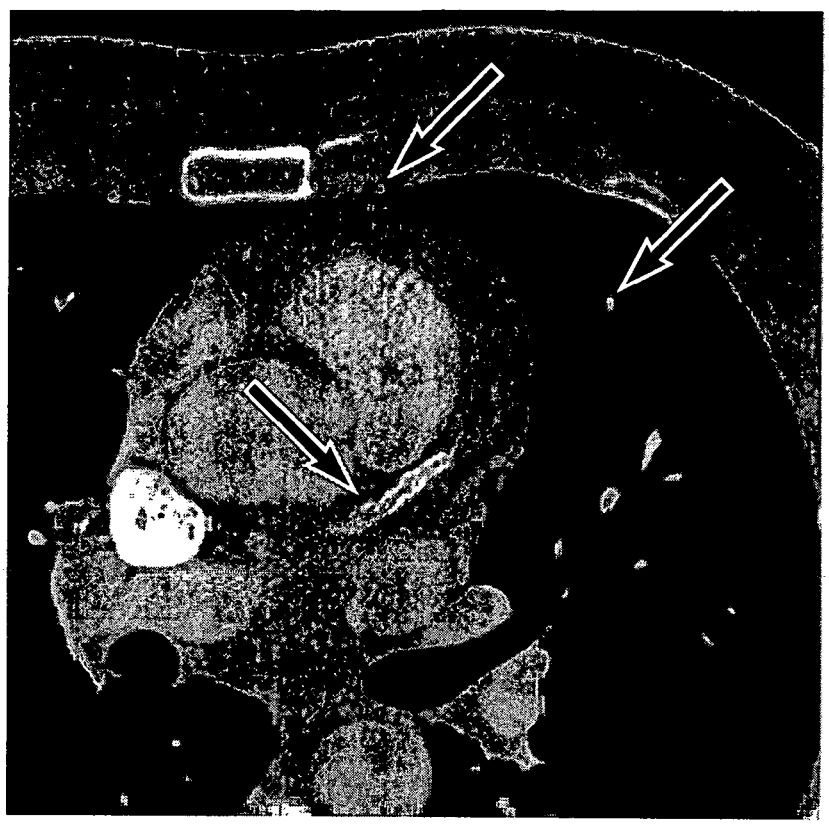
FIG. 7: shows a cardio CT picture without filtering.
Figure 8:
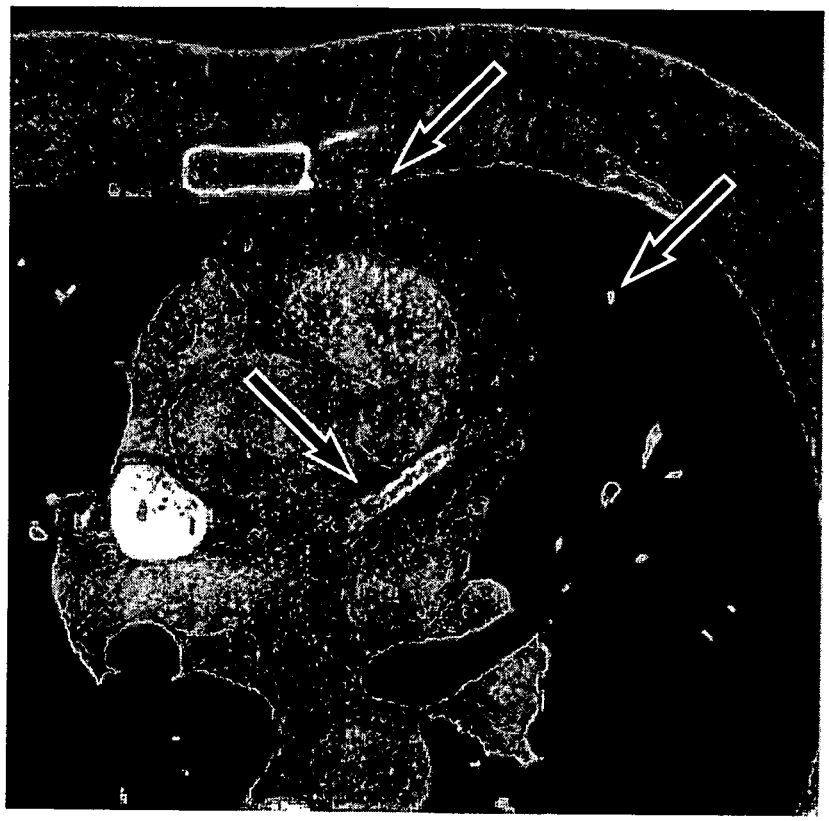
FIG. 8: shows a cardio CT picture with filtering according to an embodiment of the invention.

FIGS. 7 and 8 once again show a comparison of a CT image without and with filtering, in order to demonstrate the advantages of the method according to the invention. FIG. 7 shows a cardio scan with a section through a coronary stent (=metal mesh for dilating coronary arteries), the arrows depicted pointing to small vessels and calcifications. It can clearly be seen in the picture of FIG. 8, which has been processed and filtered according to the invention, that these small structures continue to be retained while a clear reduction in noise results as desired in the large areas, for example in the ventricles. The reduction in noise is in this case approximately 36%. Computationally, the filtered image corresponds to a radiation dose higher by approximately 80%. Conversely, it would have been possible to achieve the same image noise as in the original with a dose lower by approximately 45%. Clearly, in the case of bone or the coronary stent edges are not smeared and small vessels and calcifications are retained. The latter even appear substantially more clearly after the filtering process.

It is to be pointed out furthermore that it is also within the scope of the embodiments of the invention when, for the purpose of more effectively determining directions and planes of minimum or maximum variance, any desired extended method, for example an iteration method, is carried out in order to find the exact directions of minimum or maximum variance which may lie between the preferred calculated spatial directions.

A typical application of the method is therefore to be seen for example, in reducing the dose of CT angiographs (CTA). Particularly in the case of cardiac CTAs there is the problem of not wanting to visualize small vessels, that is to say of needing a sharp convolutional kernel in the reconstruction, although the sharpness is paid for with a high noise level. Consequently, with a CT image there is always a need to compromise with sharpness and noise. The ratio of sharpness to noise can be decisively improved, however, by the filter under discussion, as the exemplary pictures show.

It goes without saying that the abovementioned features of embodiments of the invention can be used not only in the respectively specified combination, but also in other combinations or on their own without departing from the scope of the invention.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for filtering tomographic 3D images of an examination object, the examination object being imaged by using a volume model that divides the volume of the examination object into a multiplicity of three-dimensional image voxels with individual image values, and the image value of each voxel reproducing an object-specific property of the examination object in this volume, the method comprising:

calculating, after the reconstruction of the total volume, variances for each image voxel in a prescribed region or radius to determine contrast jumps and their spatial orientation with their tangential planes;

filtering the image values in the tangential plane with a two-dimensional convolution; and mixing the original voxel data in weighted fashion with the filtered voxel data, wherein the spatial orientation of a contrast jump is determined by the tangential plane thereof, this plane being defined by the vectors $v_{min}$ and $v_\perp$, the vector $v_\perp$ in turn being perpendicular to the plane defined by the vectors $v_{min}$ and $v_{max}$ and the vector $v_{min}$ pointing in the direction of the largest magnitude of the variance, and the vector $v_{min}$ pointing in the direction of the smallest magnitude of the variance, the filtering is carried out in the tangential plane by two-dimensional convolution in such a way that the filter is formed as a function of the minimum variance $v_{min}$ and the maximum variance $v_\perp$ in the tangential plane, a typical variance $v_{typ}$ is determined in the surroundings and the original voxel data are mixed in weighted fashion with the filtered voxel data in such a way that in the case of $v_{max} \gg v_{typ}$ a greater weight is ascribed to the original voxel data than to the filtered voxel data, and in the case of $v_{max} \ll v_{typ}$ a lesser weight is ascribed to the original voxel data than to the filtered voxel data, and the calculating, the filtering and the mixing is for at least one of Computed Tomography (CT), Nuclear Magnetic Resonance (NMR), and Positron Emission Tomography (PET) pictures of a medical patient using a system including at least one of a CT device, an NMR device, and a PET device.

2. The method as claimed in claim 1 wherein one-dimensional variances are calculated for at least three spatial directions of which three spatial directions are linearly independent.

3. The method as claimed in claim 2, wherein the multiplicity of spatial directions for which one-dimensional variances are calculated are distributed as uniformly as possible in space.

4. The method as claimed in claim 1, wherein at least one of canonical axes, surface diagonals, and space diagonals of an arbitrary cuboid reference volume in the examination area are used as spatial directions.

5. The method as claimed in claim 1, wherein the filter is designed in such a way that when the variances $v_{min}$ and $v_\perp$ are of different size a smaller filter strength is used in the direction of larger variance and a larger filter strength is used in the direction of smaller variance.

6. The method as claimed in claim 1, wherein the filter is of isotropic design in the case of variances $v_{min}$ and $v_\perp$ of equal size.

7. The method as claimed in claim 1, wherein two-dimensional variances are calculated on at least three planes of which two are linearly independent of one another.

8. The method as claimed in claim 7, wherein the multiplicity of planes in which the two-dimensional variance is calculated are aligned distributed as uniformly as possible in space with reference to their normal vector.

9. The method as claimed in claim 7, wherein use is made of planes over which the two-dimensional variances are determined and whose normal corresponds to at least one of the canonical axes, surface diagonals and space diagonals of an arbitrary cuboid reference volume in the examination area.

10. The method as claimed in claim 7, wherein the plane which has the smallest two-dimensional variance is selected as tangential plane.

11. The method as claimed in claim 7, wherein one-dimensional variances of different directions are determined in the tangential plane and the direction of the minimum variance $v_{min}$ and the perpendicular $v_\perp$ thereto are determined therefrom, the perpendicular $v_\perp$ being taken by definition as the direction of the maximum one-dimensional variance $vT_{,max}$ in the tangential plane.

12. The method as claimed in claim 7, wherein one-dimensional variances of different directions are determined in the tangential plane and the direction of the maximum variance in the plane $v_{max}$ and the perpendicular $v_\perp$ thereto are determined therefrom, the perpendicular $v_\perp$ being taken by definition as the direction of the minimum one-dimensional variance $v_{T,min}$ in the tangential plane.

13. The method as claimed in claim 7, wherein the filtering is carried out in the tangential plane by two-dimensional convolution in such a way that a filter $F(v_{min}, v_{T,max})$ or $F(v_{max}, v_{T,min})$ is formed as a function of the maximum variance $v_{max}$ and the minimum variance $v_{T,min}$ or of the minimum variance $v_{min}$ and the maximum variance $vT_{,max}$ in the tangential plane T.

14. The method as claimed in claim 13, wherein the filter $F(v_{min}, v_{T,max})$ or $F(v_{max}, v_{T,min})$ is designed in such a way that when the variances are of different size a smaller filter strength is used in the direction of larger variance and a larger filter strength is used in the direction of smaller variance.

15. The method as claimed in claim 13, wherein the filter $F(v_{min}, v_{T,max})$ or $F(v_{max}, v_{T,min})$ is of isotropic design in the case of variances of equal size.

16. The method as claimed in claim 1, wherein the mean value of the previously determined one-dimensional variances is taken as typical variance $v_{typ}$ in the surroundings.

17. The method as claimed in claim 1, wherein the mean value of previously determined two-dimensional variances is taken as typical variance $v_{typ}$ in the surroundings.

18. The method as claimed in claim 1, wherein the mean value of a previously determined three-dimensional variance in a prescribed region or a radius R is taken as typical variance $v_{typ}$ in the surroundings.

19. A medical tomography system for examining a patient and for taking tomographic pictures of a patient, comprising:
- a recording system; and
- at least one arithmetic logic unit with programs or program modules for reconstructing tomographic images, wherein at least one arithmetic logic unit has programs or program modules that execute during operation the method steps of claim 1.

20. The method as claimed in claim 5, wherein the filter is of isotropic design in the case of variances $v_{min}$ and $v_\perp$ of equal size.

21. The method as claimed in claims 8, wherein use is made of planes over which the two-dimensional variances are determined and whose normal corresponds to at least one of the canonical axes, surface diagonals and space diagonals of an arbitrary cuboid reference volume in the examination area.

22. The method as claimed in claim 10, wherein one-dimensional variances of different directions are determined in the tangential plane and the direction of the minimum variance $v_{min}$ and the perpendicular $v_\perp$ thereto are determined therefrom, the perpendicular $v_\perp$ being taken by definition as the direction of the maximum one-dimensional variance $vT,_{max}$ in the tangential plane.

23. The method as claimed in claim 10, wherein one-dimensional variances of different directions are determined in the tangential plane and the direction of the maximum variance in the plane $v_{max}$ and the perpendicular $v_\perp$ thereto are determined therefrom, the perpendicular $v_\perp$ being taken by definition as the direction of the minimum one-dimensional variance $v_{T,min}$ in the tangential plane.

24. A computer-readable medium having a computer program configured to cause a computer to carry out the method as claimed in claim 1.

* * * * *